United States Patent
Wade

(10) Patent No.: US 11,845,204 B2
(45) Date of Patent: Dec. 19, 2023

(54) ELASTIC FASTENER FOR VACUUM BAG PLEAT

(71) Applicant: Airtech International, Inc., Huntington Beach, CA (US)

(72) Inventor: William James Wade, Springfield, TN (US)

(73) Assignee: AIRTECH INTERNATIONAL, INC., Huntington Beach, CA (US)

( * ) Notice: Subject to any disclaimer, the term of this patent is extended or adjusted under 35 U.S.C. 154(b) by 572 days.

(21) Appl. No.: 17/109,998

(22) Filed: Dec. 2, 2020

(65) Prior Publication Data

US 2021/0086456 A1    Mar. 25, 2021

Related U.S. Application Data

(62) Division of application No. 16/048,058, filed on Jul. 27, 2018, now abandoned.

(60) Provisional application No. 62/538,448, filed on Jul. 28, 2017.

(51) Int. Cl.
*B29C 43/36* (2006.01)
*B29C 65/00* (2006.01)
*B29C 70/44* (2006.01)
*B29C 43/56* (2006.01)

(52) U.S. Cl.
CPC .......... *B29C 43/36* (2013.01); *B29C 66/4722* (2013.01); *B29C 70/443* (2013.01); *B29C 43/56* (2013.01); *B29C 2043/3644* (2013.01); *B29C 2043/3652* (2013.01)

(58) Field of Classification Search
None
See application file for complete search history.

(56) References Cited

U.S. PATENT DOCUMENTS

| 3,995,640 | A | 12/1976 | Schaar |
| 5,123,985 | A | 6/1992 | Evans et al. |
| 5,716,488 | A | 2/1998 | Bryant |
| 6,352,077 | B1 | 3/2002 | Shah |
| 7,534,387 | B2 * | 5/2009 | Zenkner ................ B29C 70/342 264/313 |

(Continued)

OTHER PUBLICATIONS

International Search Report and Written Opinion issued in corresponding PCT Application No. PCT/US2018/044222, dated Oct. 2, 2018, 8 pages.

*Primary Examiner* — Barbara J Musser
(74) *Attorney, Agent, or Firm* — Lewis Roca Rothgerber Christie LLP

(57) ABSTRACT

A vacuum bag having an expandable pleat is provided. The vacuum bag includes a first surface region, a second surface region, and a third surface region between the first and second surface regions. The third surface region can be folded to bring the first surface region into proximity of the second surface region. The vacuum bag also includes a strip having a first attaching region at a first end of the strip, a second attaching region at a second end of the strip opposite the first end, and a central region between the first and second attaching regions. The first attaching region is fixed to the first surface region, and the second attaching region is fixed to the second surface region such that when the central region of the strip is in a non-expanded state, the first surface region is contiguous to the second surface region.

15 Claims, 5 Drawing Sheets

(56) References Cited

U.S. PATENT DOCUMENTS

2006/0191624 A1 8/2006 Whitworth et al.
2011/0110612 A1 5/2011 Nelson

\* cited by examiner

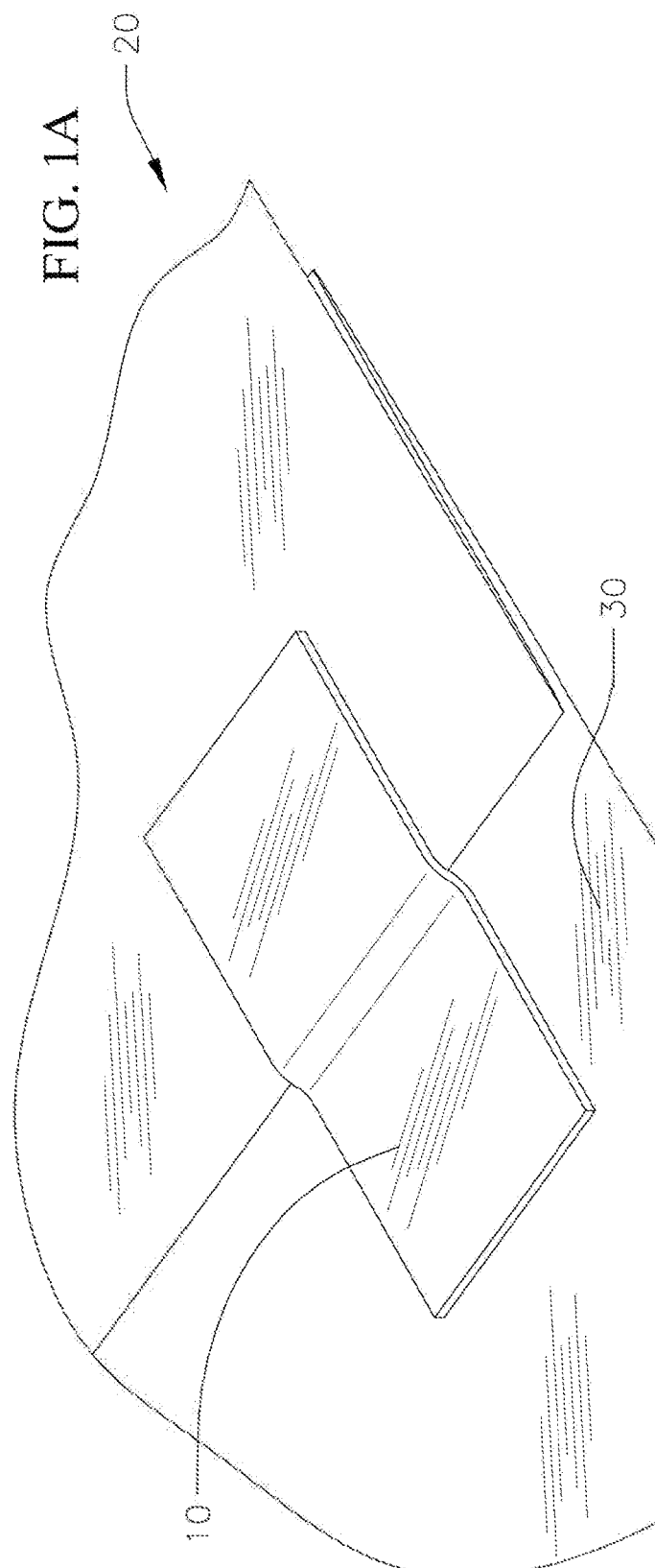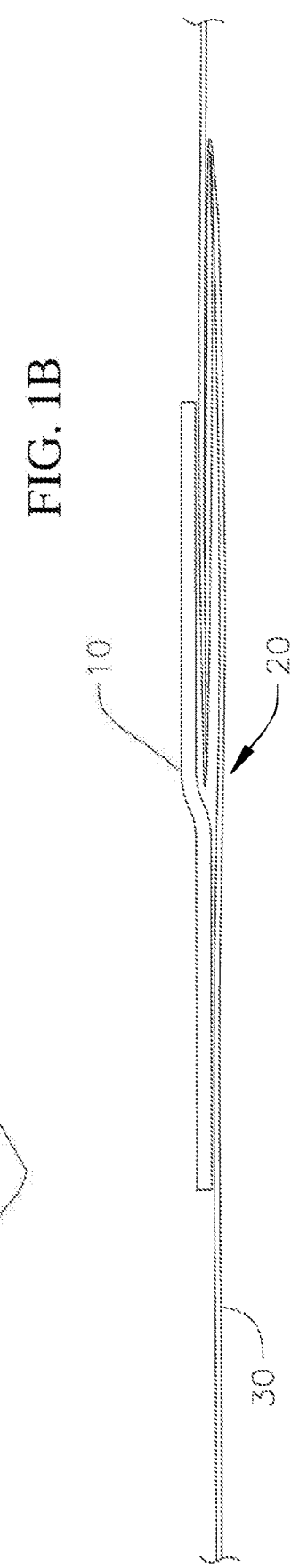

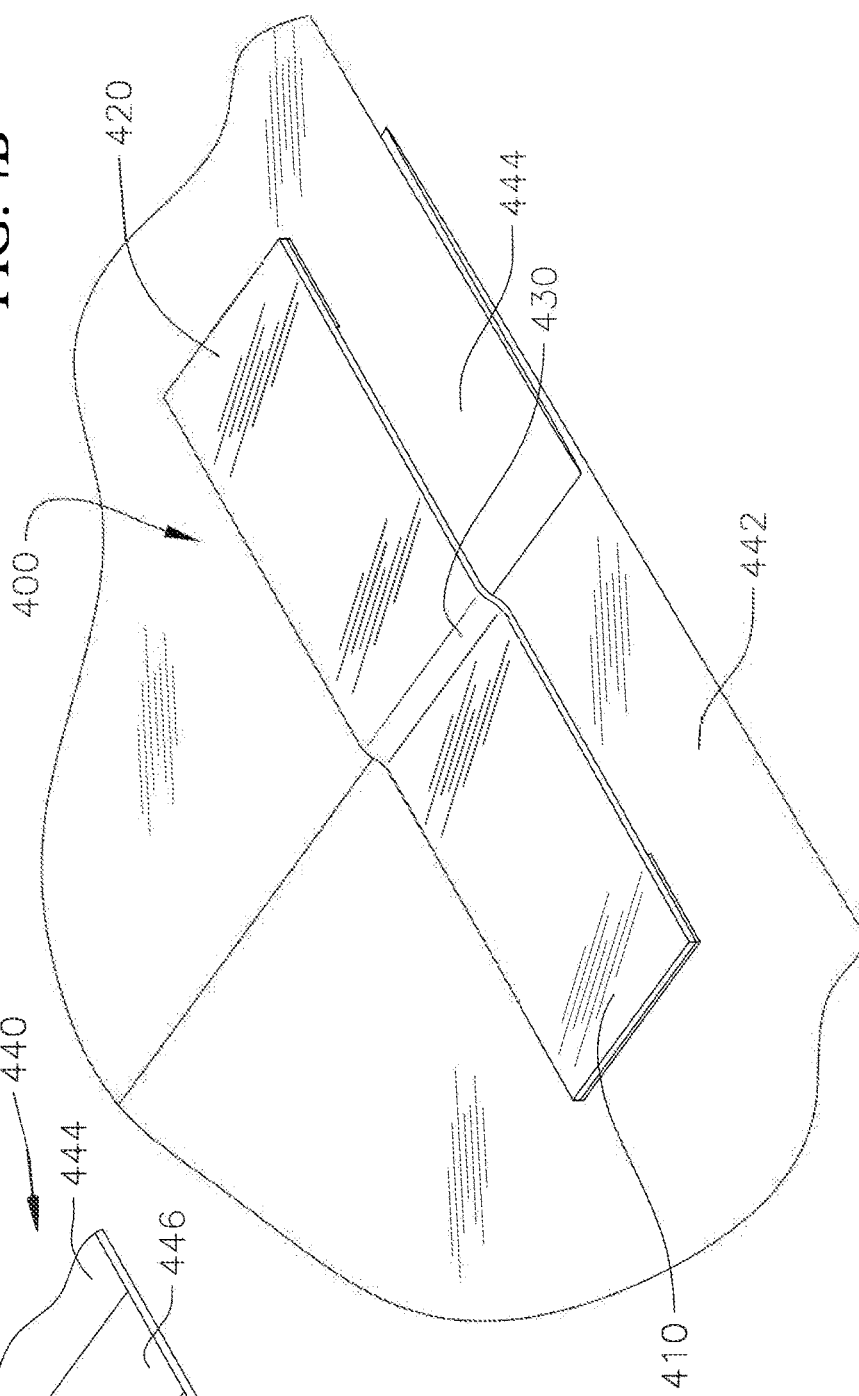
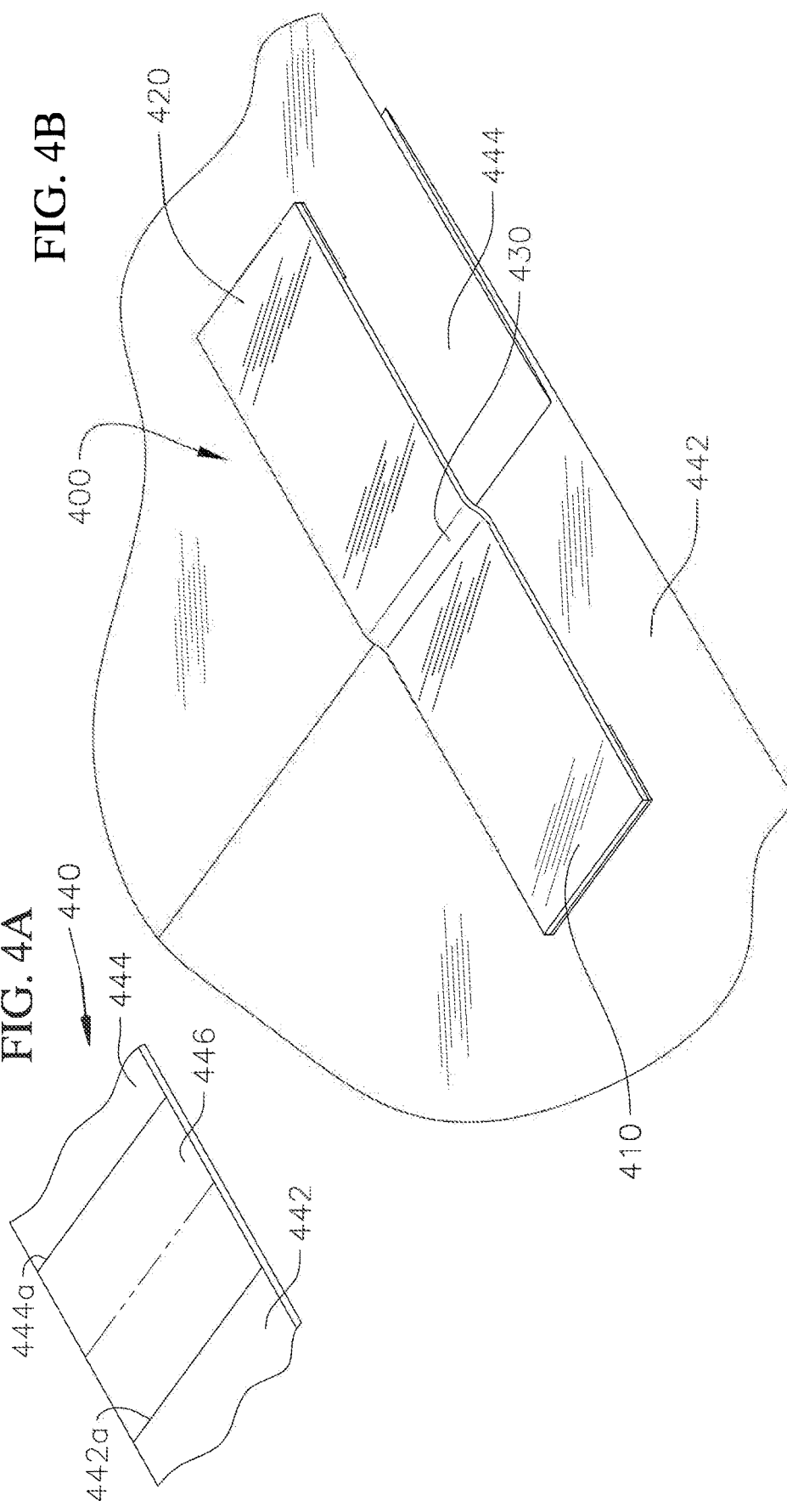
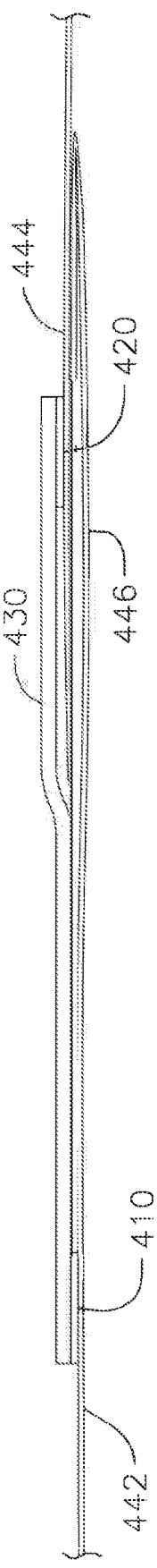

ELASTIC FASTENER FOR VACUUM BAG PLEAT

CROSS-REFERENCE TO RELATED APPLICATION(S)

This application is a divisional of U.S. patent application Ser. No. 16/048,058, filed Jul. 27, 2018, now abandoned, which claims priority to and the benefit of U.S. Provisional Patent Application No. 62/538,448, filed on Jul. 28, 2017, the contents of both of which are herein incorporated by reference in their entireties.

BACKGROUND

Vacuum bags can be used to protect a tool, part, or other object. They can be used in vacuum bag manufacturing techniques to, e.g., protect a tool (e.g., a mold) or to compress the manufactured part onto the tool (e.g., during the process of impregnating the part with a resin or curing the resin).

Vacuum bags may be constructed from thin sheeting. In order to cause a vacuum bag to closely fit the geometry of the tool it will be placed over or is currently placed over, the vacuum bag may be pleated and/or darted (hereinafter "pleated"). A portion of the sheet may be folded over itself to bring two spaced apart areas of the surface of the sheet adjacent to each other, thereby forming a pleat. FIG. 1A is a perspective view of a pleat 20 in a vacuum bag 30 according to a related art. FIG. 1B is a side view of the pleat 20 in the vacuum bag 30 of FIG. 1A. Once the pleat is formed, one or more strips of pressure sensitive tape 10 may be applied across the pleat to hold it in place, maintaining the shape of the vacuum bag.

The above information disclosed in this Background section is only for enhancement of understanding of the background of the invention, and therefore it may contain information that does not form the prior art that is already known to a person of ordinary skill in the art.

SUMMARY

According to an aspect of embodiments of the present disclosure, a vacuum bag having expandable pleats is provided.

According to an aspect of the present disclosure, a vacuum bag is disclosed. The vacuum bag includes a bag surface and a strip. The bag surface includes a first surface region, a second surface region, and a third surface region between the first surface region and the second surface region, the third surface region configured to be folded to bring the first surface region into proximity of the second surface region. The strip has a first attaching region at a first end of the strip, a second attaching region at a second end of the strip opposite the first end, and a central region between the first attaching region and the second attaching region, the first attaching region being fixed to the first surface region, the second attaching region being fixed to the second surface region. The first attaching region is fixed to the first surface region and the second attaching region is fixed to the second attaching region such that when the central region of the strip is in a non-expanded state, the first surface region is contiguous to the second surface region.

In some embodiments, the bag surface comprises a polymer film.

In some embodiments, the strip comprises a polyurethane film.

In some embodiments, the central region of the strip has an elasticity between 600 and 1,800 psi.

In some embodiments, the first attaching region and the second attaching region are fixed to the first surface region and the second surface region, respectively, by an acrylic adhesive.

In some embodiments, the first attaching region and the second attaching region are fixed to the first surface region and the second surface region, respectively, using double sided pressure sensitive adhesive tape.

In some embodiments, the first attaching region and the second attaching region are treated with a corona treatment.

According to another aspect of the present disclosure, a method of forming an expandable pleat in a vacuum bag is disclosed. The method includes pleating a bag surface, the bag surface comprising a first surface region, a second surface region, and a third surface region between the first surface region and the second surface region, the third surface region being configured to be folded to bring the first surface region into proximity of the second surface region; fixing a first attaching region at a first end of a strip to the first surface region; and fixing a second attaching region at a second end of the strip opposite the first end to the second surface region. The strip comprises a central region between the first attaching region and the second attaching region, and the first attaching region is fixed to the first surface region and the second attaching region is fixed to the second attaching region such that when the central region of the strip is in a non-expanded state, the first surface region is contiguous to the second surface region.

In some embodiments, the bag surface comprises a polymer film.

In some embodiments, the strip comprises a polyurethane film.

In some embodiments, the central region of the strip has an elasticity between 600 and 1,800 psi.

In some embodiments, fixing the first attaching region to the first surface region comprises applying a first acrylic adhesive to the first attaching region, and wherein fixing the second attaching region to the second surface region comprises applying a second acrylic adhesive to the second attaching region.

In some embodiments, fixing the first attaching region to the first surface region comprises applying a first double sided pressure sensitive adhesive tape to the first attaching region, and wherein fixing the second attaching region to the second surface region comprises applying a second double sided pressure sensitive adhesive tape to the second attaching region.

In some embodiments, fixing the first attaching region to the first surface region comprises treating the first attaching region with a corona treatment, and wherein fixing the second attaching region to the second surface region comprises treating the second attaching region with a corona treatment.

According to another aspect of the present disclosure, an expandable fastener for a pleat in a vacuum bag is disclosed. The vacuum bag includes a first surface region, a second surface region, and a third surface region between the first surface region and the second surface region, the third surface region configured to be folded to bring the first surface region into proximity of the second surface region. The expandable fastener includes a first attaching region at a first end of a strip, the first attaching region being fixed to the first surface region; a second attaching region at a second end of the strip opposite the first end, the second attaching region being fixed to the second surface region; and a central region between the first attaching region and the second attaching region, the first attaching region being fixed to the first surface region, the second attaching region being fixed to the second surface region. The first attaching region is fixed to the first surface region and the second attaching region is fixed to the second attaching region such that when the central region of the strip is in a non-expanded state, the first surface region is contiguous to the second surface region.

In some embodiments, the strip comprises a polyurethane film.

In some embodiments, the central region of the strip has an elasticity between 600 and 1,800 psi.

In some embodiments, the first attaching region and the second attaching region are fixed to the first surface region and the second surface region, respectively, by an acrylic adhesive.

In some embodiments, the first attaching region and the second attaching region are fixed to the first surface region and the second surface region, respectively, using double sided pressure sensitive adhesive tape.

In some embodiments, the vacuum bag comprises a polymer film.

BRIEF DESCRIPTION OF THE DRAWINGS

The accompanying drawings, together with the specification, illustrate example embodiments of the present disclosure, and, together with the description, serve to explain the principles of the present disclosure.

FIG. 1A is a perspective view of a pleat in a vacuum bag with pressure sensitive tape according to a related art.

FIG. 1B is a side view of the pleat in the vacuum bag with pressure sensitive tape of FIG. 1A.

FIG. 4A is a surface of a vacuum bag prior to pleating.

FIG. 4B is a perspective view of a pleat in a vacuum bag with an elastic fastener according to embodiments of the present disclosure.

FIG. 4C is a side view of the pleat in the vacuum bag with an elastic fastener of FIG. 4A.

DETAILED DESCRIPTION

Figure 2:
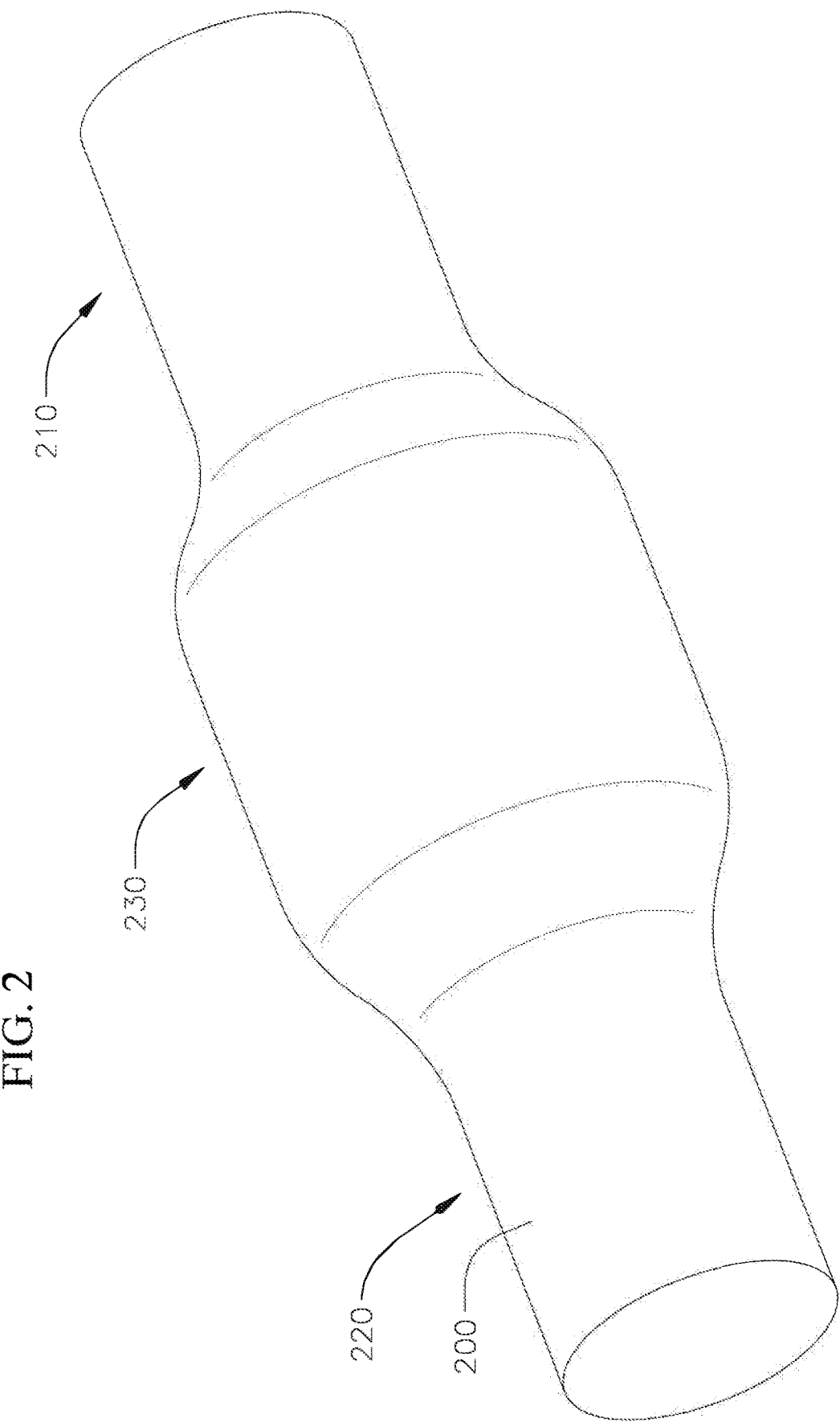
FIG. 2 is a tool according to embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

The present disclosure is directed to vacuum bags with expanding fasteners used in fixing pleats, darts, or other similar folds (hereinafter "pleats") to allow the vacuum bag to retain its shape.

FIG. 2 is a tool 200 according to embodiments of the present disclosure. The tool 200 includes a first narrow section 210, a wide section 230, and a second narrow section 220. The wide section 230 may have a larger diameter than the first and second narrow sections 210 and 220.

A vacuum bag may be placed around the tool 200 by bringing an opening in the vacuum bag over the end of the tool at the first narrow section 210, passing the opening along the axis of the tool 200 past the wide section 230 and past the second narrow section 220, and sealing the opening of the vacuum bag at the other end. Where the vacuum bag is designed to closely fit to the shape of the tool 200, this process requires passing a portion of the vacuum bag designed to conform to the second narrow section 220 of the tool over the wide section 230. Where pleats are secured with a pressure sensitive tape, such as described above with respect to FIGS. 1A and 1B, the pressure sensitive tape strips on the pleats which conform the vacuum bag to the narrow section 220 may disengage from the surface of the sheeting, thereby releasing the pleat and changing the shape of the bag, which may require that the pleats be re-formed and re-secured. Alternatively, a technician may need to wait to form and secure the pleats until after the vacuum bag is in place on the tool 200.

In addition, the vacuum bag may be made of various polymeric films such as Nylon which may expand and contract depending upon their environment. Contraction of the vacuum bag around the tool 200 may also cause a pressure sensitive tape to disengage and release a pleat.

Note, the tool 200 is a simplified, exemplary tool. Its shape was chosen to illustrate the embodiments of the present disclosure in a simple and clear manner. However, a person of skill in the art will appreciate that the present disclosure can be utilized with tools of a wide range of shapes and sizes, and the present disclosure is not limited to vacuum bags conforming to tools having the shape of the tool 200.

Figure 3:
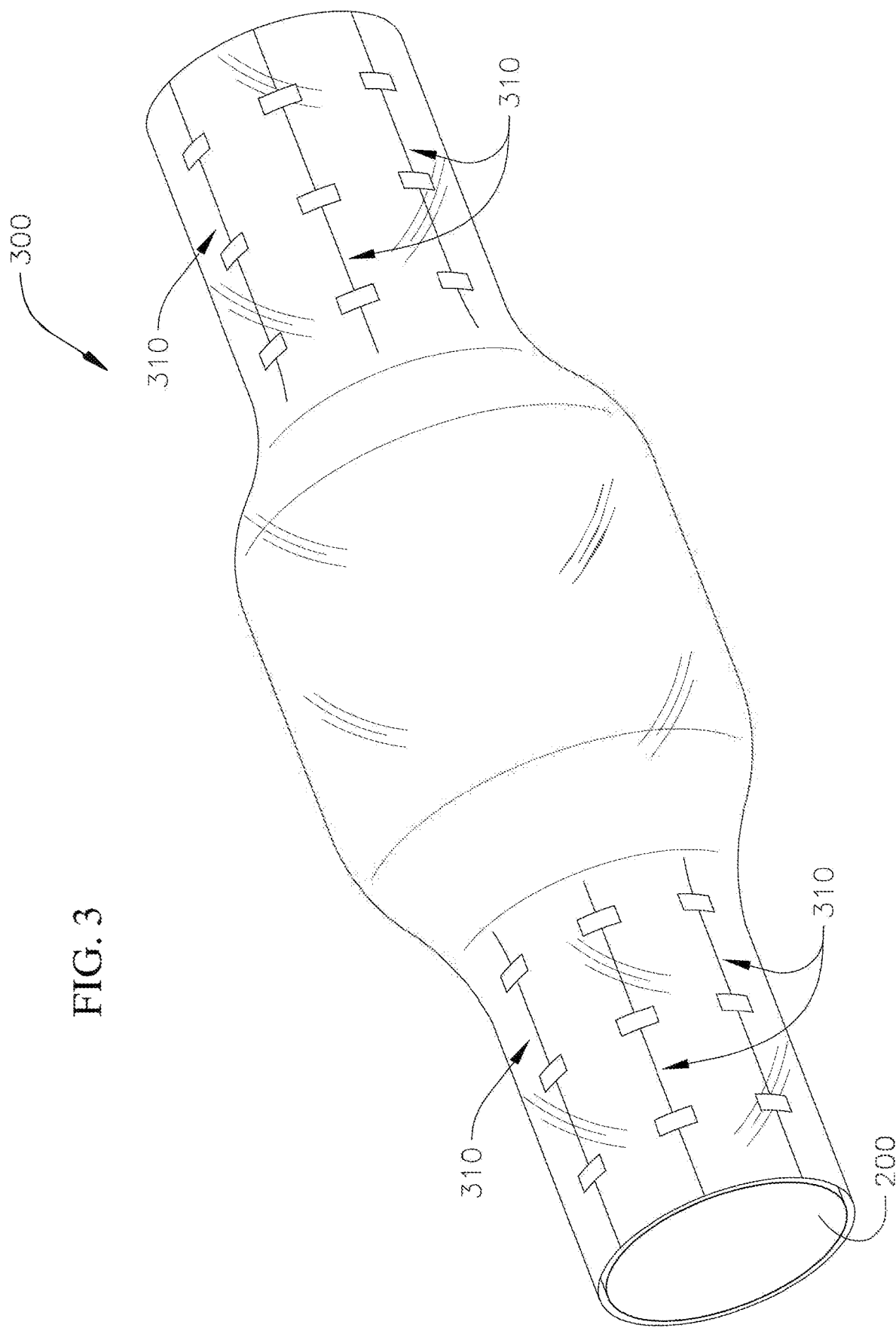
FIG. 3 is the tool of FIG. 2 inside a vacuum bag according to embodiments of the present disclosure.

FIG. 3 is the tool 200 of FIG. 2 inside a vacuum bag 300 according to embodiments of the present disclosure. The vacuum bag 300 includes one or more expandable pleats 310 conforming the vacuum bag 300 to the shape of the tool 200. For example, the vacuum bag 300 may include expandable pleats 310 in the portions of the vacuum bag 300 corresponding to the first narrow section 210 and the second narrow section 220 of the tool 200. The expandable pleats include expandable fasteners which can stretch, allowing the pleat to expand without disengaging the fasteners from the surface of the vacuum bag 300, and then return to their original state, retaining the shape of the vacuum bag. The expandable pleats 310 in the portion of the vacuum bag 300 corresponding to the second narrow portion 220 may be able to expand to allow them to pass over the wide section 230 of the tool 200 without disengaging the expandable fasteners and return to their shape conforming with the narrow portion 220.

FIG. 4A is a surface 440 of a vacuum bag prior to pleating. The body of the vacuum bag, including the vacuum bag surface 440, may be formed of a sheet of film. The film may include a polymeric or plastic film, including Nylon film. In some embodiments, body of the vacuum bag may include a monolayer polymeric or plastic film. In some embodiments, the body of the vacuum bay may include a multilayer film. In some embodiments, the multilayer film may have between 2 and 12 layers of polymeric and/or plastic film.

The surface 440 may include a first region 442, a second region 444, and a third surface region 446. The third surface region 446 is between the first region 442 and the second region 444. A first edge 442a of the first region 442 defines the boundary between the first region 442 and the third surface region 446. A first edge 444a of the second region 444 defines the boundary between the second region 444 and the third surface region 446.

FIG. 4B is a perspective view of a pleat in a vacuum bag including an elastic fastener according to embodiments of the present disclosure. FIG. 4C is a side view of the pleat in the vacuum bag with the elastic fastener of FIG. 4A. The pleat of FIGS. 4A and 4B is in a non-expanded state. The surface 440 of the vacuum bag is pleated by, e.g., folding the third surface region 446 underneath the second region 444. The first edge 442a of the first region 442 is in contact with the first edge 444a of the second region 444. That is, the first region 442 and the second region 444 are adjacent one another (e.g., contiguous with one another).

An expandable fastener 400 is attached to the surface 440 of the vacuum bag at the pleat. The expandable fastener 400 includes a first attaching region 410, a second attaching region 420, and a third region 430 (i.e., a central region). The first attaching region 410 may be fixed to the first surface region 442 and the second attaching region 420 may be fixed to the second surface region 444. The third region 430 may be between the first and second attaching regions 410 and 420, but not fixed to the surface 440 of the vacuum bag except by means of being fixed to the first and second attaching regions 410 and 420. The third region 430 may be expandable (e.g., elastic). As shown in FIGS. 4B and 4C, the first and second attaching regions 410 and 420 of the expandable fastener 400 may be fixed to the first and second surface regions 442 and 444 of the vacuum bag at positions such that the first and second surface regions 442 and 444 of the vacuum bag are contiguous when the third region 430 is in a non-expanded state (e.g., is not stretched, or is insignificantly stretched).

Figure 5A:
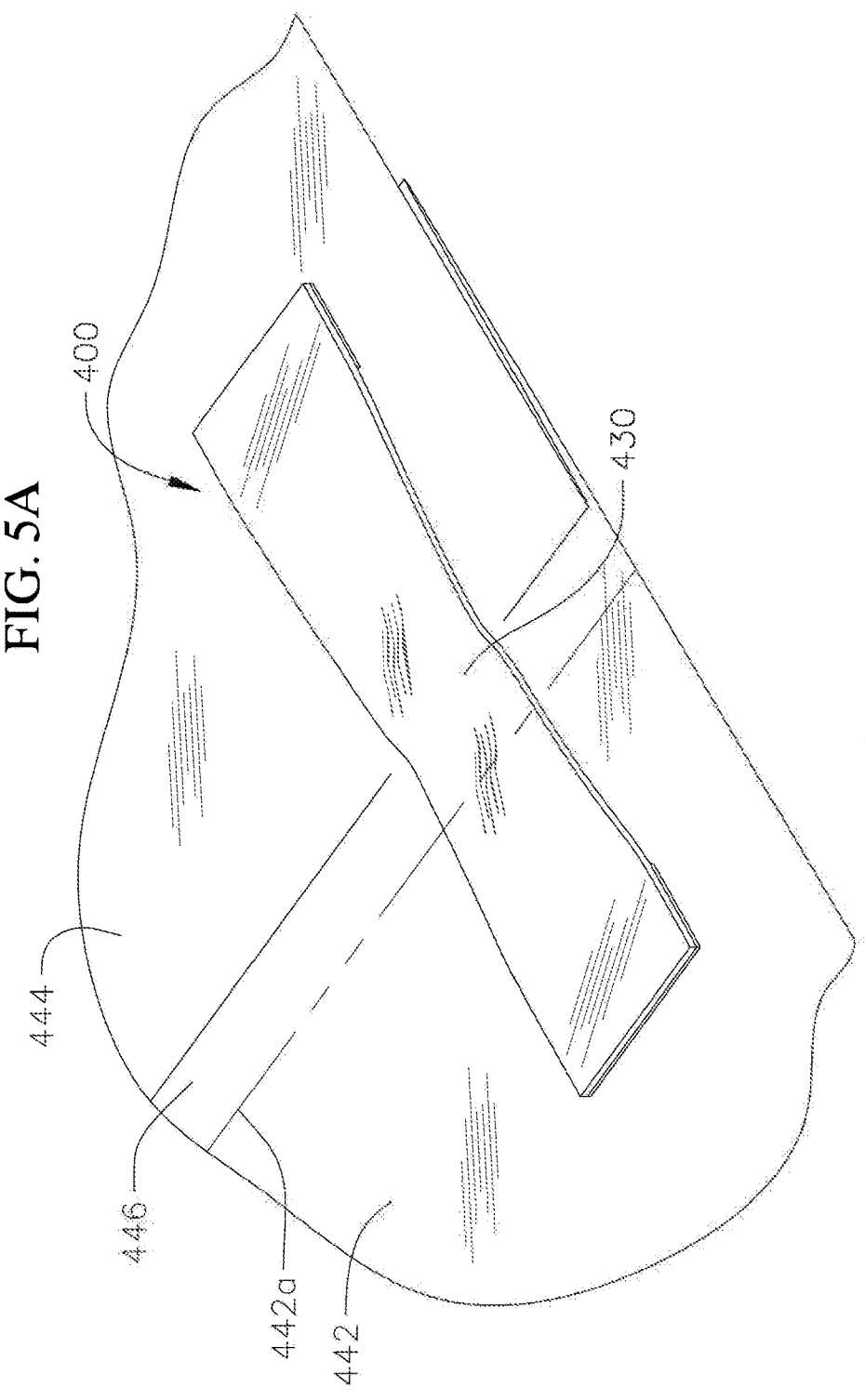
FIG. 5A is a perspective view of a pleat in a vacuum bag with an elastic fastener according to embodiments of the present disclosure.
Figure 5B:
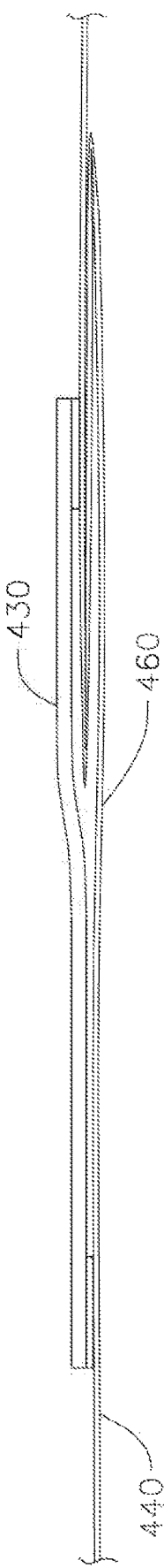
FIG. 5B is a side view of the pleat in the vacuum bag with an elastic fastener of FIG. 5A.

FIG. 5A is a perspective view of a pleat in a vacuum bag with an elastic fastener according to embodiments of the present disclosure. FIG. 5B is a side view of the pleat in the vacuum bag with an elastic fastener of FIG. 5A. The pleat of FIGS. 5A and 5B is in an expanded state. The first surface region 442 has been pulled away from the second surface region 444, exposing a portion of the third surface region 446. The third region 430 of the expandable fastener 400 is in a stretched state, allowing the first attaching region 410 and the second attaching region 420 to remain fixed to the surface 440 of the vacuum bag at their respective locations. When pressure is released from the surface 440, the expandable fastener 430 will attempt to return to its non-expanded state, thereby returning the first surface region 442 and the second surface region 444 into their contiguous positions.

In some embodiments, the third region 430 may have an elasticity of about 1,000 psi. For example, in some embodiments, the third region 430 may have an elasticity between 100 and 4,500 psi. In some embodiments, the third region 430 may have an elasticity between 600 and 1,800 psi.

The expandable fastener 400 may include an elastic strip. An adhesive may coat the first attaching region 410 and the second attaching region 420, but the third region 430 may be free of adhesive (e.g. first attaching region 410 and the second attaching region 420 are not contiguous). The adhesive may be a pressure sensitive adhesive or an ultraviolet cured adhesive. In some embodiments, the adhesive may be an acrylic adhesive. In some embodiments, the adhesive may be a double sided tape applied to the first and second attaching regions 410 and 420. The double sided tape may be Airhold 1, commercially available from Air Tech International.

In some embodiments, the first attaching region 410 and the second attaching region 420 are treated to aid in fixing an adhesive or an adhesive tape to the strip. In some embodiments, the first and second attaching regions 410 and 420 may be treated with a T7 corona treatment. In some embodiments, the first and second attaching regions 410 and 420 may be treated with a T1 plasma treatment. In some embodiments, the first and second attaching regions 410 and 420 may undergo chemical etching. In some embodiments, an intermediary material may be applied to the first and second attaching regions 410 and 420 to aid in bonding with an adhesive or an adhesive tape.

In some embodiments, the first and second attaching regions 410 and 420 are fixed to the first surface region 442 and the second surface region 444, respectively, through non-adhesive means, such as heat sealing.

In some embodiments, the strip may include a mono-layer or multi-layer thermoplastic elastomeric polymer substrate. For example, the strip may include styrenic block copolymers (TPE-s), Thermoplastic olefins (TPE-o), elastomeric alloys (TPE-v or TPV), thermoplastic polyurethanes (TPU), thermoplastic copolyester (TPE-E), aromatic polyether polyurethane, and/or thermoplastic polyamides.

In some embodiments, the strip may include an unsaturated rubber substrate. For example, the strip may include natural polyisoprene: cis-1,4-polyisoprene natural rubber (NR) and trans-1,4-polyisoprene gutta-percha; synthetic polyisoprene (IR for isoprene rubber); polybutadiene (BR for butadiene rubber); chloroprene rubber (CR), polychloroprene, Neoprene, Baypren etc.; butyl rubber (copolymer of isobutylene and isoprene, IIR); halogenated butyl rubbers (chloro butyl rubber: CIIR; bromo butyl rubber: BIIR); styrene-butadiene Rubber (copolymer of styrene and butadiene, SBR); nitrile rubber (copolymer of butadiene and acrylonitrile, NBR), also called Buna N rubbers; and/or Hydrogenated Nitrile Rubbers (HNBR) Therban and Zetpol.

In some embodiments, the strip may include a saturated rubber substrate. For example, the strip may include EPM (ethylene propylene rubber, a copolymer of ethylene and propylene) and EPDM rubber (ethylene propylene diene rubber, a terpolymer of ethylene, propylene and a diene-component); epichlorohydrin rubber (ECO), polyacrylic rubber (ACM, ABR), silicone rubber (SI, Q, VMQ); fluorosilicone rubber (FVMQ); fluoroelastomers (FKM, and FEPM) Viton, Tecnoflon, Fluorel, Aflas and Dai-El; perfluoroelastomers (FFKM) Tecnoflon PFR, Kalrez, Chemraz, Perlast; polyether block amides (PEBA); chlorosulfonated polyethylene (CSM), (Hypalon); and/or ethylene-vinyl acetate (EVA).

In some embodiments, the strip may have a width (i.e., in the direction running parallel to the pleat) of about 0.5 inches. For example, in some embodiments, the strip may have a width between 0.75 and 0.25 inches. In some embodiments, the strip may have a width between 0.6 and 0.4 inches.

In some embodiments, the strip may have a width of 1 inch. For example, in some embodiments, the strip may have a width between 1.25 and 0.75 inches. In some embodiments, the strip may have a width between 1.1 and 0.9 inches.

In some embodiments, the strip may have a width of 2 inches. For example, in some embodiments, the strip may have a width between 2.25 and 1.75 inches. In some embodiments, the strip may have a width between 2.1 and 1.9 inches.

In some embodiments, the strip may have a length (i.e., in the direction crossing the pleat) of two inches. For example, in some embodiments, the strip may have a length between 2.25 and 1.75 inches. In some embodiments, the strip may have a length between 2.1 and 1.9 inches.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of forming an expandable pleat in a bag surface of a vacuum bag comprising a first surface region, a second surface region, and a third surface region between the first surface region and the second surface region, the method comprising:

pleating the bag surface of the vacuum bag, comprising folding the third surface region such that the first surface region is proximate to the second surface region;

fixing a first attaching region at a first end of an elastic strip to the first surface region; and fixing a second attaching region at a second end of the elastic strip opposite the first end to the second surface region, wherein the elastic strip comprises a central region between the first attaching region and the second attaching region, and wherein, when the central region of the elastic strip is in a non-expanded state, the first surface region is contiguous to the second surface region.

2. The method of claim 1, wherein the bag surface of the vacuum bag comprises a polymer film.

3. The method of claim 1, wherein the elastic strip comprises a polyurethane film.

4. The method of claim 1, wherein the central region of the elastic strip has an elasticity between approximately 600 psi and approximately 1,800 psi.

5. The method of claim 1, wherein fixing the first attaching region to the first surface region comprises applying a first acrylic adhesive to the first attaching region, and wherein fixing the second attaching region to the second surface region comprises applying a second acrylic adhesive to the second attaching region.

6. The method of claim 1, wherein fixing the first attaching region to the first surface region comprises applying a first double-sided pressure sensitive adhesive tape to the first attaching region, and wherein fixing the second attaching region to the second surface region comprises applying a second double-sided pressure sensitive adhesive tape to the second attaching region.

7. The method of claim 1, wherein fixing the first attaching region to the first surface region comprises treating the first attaching region with a corona treatment, and wherein fixing the second attaching region to the second surface region comprises treating the second attaching region with a corona treatment.

8. The method of claim 1, wherein fixing the first attaching region to the first surface region comprises treating the first attaching region with a plasma treatment, and wherein fixing the second attaching region to the second surface region comprises treating the second attaching region with a plasma treatment.

9. The method of claim 1, wherein fixing the first attaching region to the first surface region comprises chemical etching the first attaching region, and wherein fixing the second attaching region to the second surface region comprises chemical etching the second attaching region.

10. The method of claim 1, wherein fixing the first attaching region to the first surface region comprises non-adhesively attaching the first attaching region to the first surface region, and wherein fixing the second attaching region to the second surface region comprises non-adhesively attaching the second attaching region to the second surface region.

11. The method of claim 10, wherein fixing the first attaching region to the first surface region comprises heat sealing the first attaching region to the first surface region, and wherein fixing the second attaching region to the second surface region comprises heat sealing the second attaching region to the second surface region.

12. The method of claim 1, wherein the elastic strip comprises a mono-layer substrate.

13. The method of claim 1, wherein the elastic strip comprises a multi-layer substrate.

14. The method of claim 1, wherein the elastic strip comprises an unsaturated rubber substrate.

15. The method of claim 1, wherein the elastic strip comprises a saturated rubber substrate.

\* \* \* \* \*